(12) United States Patent
Hampton et al.

(10) Patent No.: US 10,430,444 B1
(45) Date of Patent: Oct. 1, 2019

(54) INTERACTIVE GEOSPATIAL MAP AND GEOSPATIAL VISUALIZATION SYSTEMS

(71) Applicant: Palantir Technologies Inc., Palo Alto, CA (US)

(72) Inventors: Jesse Hampton, New York, NY (US); Andrew Higgins, Washington, DC (US); Akshay Krishnaswamy, Palo Alto, CA (US); Aaron Rubin, New York, NY (US); Frank Chen, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/895,954

(22) Filed: Feb. 13, 2018

Related U.S. Application Data

(60) Provisional application No. 62/536,339, filed on Jul. 24, 2017.

(51) Int. Cl.
  *G06F 16/29* (2019.01)
  *H04N 21/4728* (2011.01)
  (Continued)

(52) U.S. Cl.
  CPC ............ *G06F 16/29* (2019.01); *G06F 3/0482* (2013.01); *G06F 16/7335* (2019.01); *G08G 1/20* (2013.01);
  (Continued)

(58) Field of Classification Search
  CPC .... G01S 5/0027; G06Q 10/0833; G08G 1/20; H04W 4/029; G06F 17/30241;
  (Continued)

(56) References Cited

U.S. PATENT DOCUMENTS

| | | |
|---|---|---|
| 5,515,488 A | 5/1996 | Hoppe et al. |
| 6,430,305 B1 | 8/2002 | Decker |

(Continued)

FOREIGN PATENT DOCUMENTS

| | | |
|---|---|---|
| CN | 102546446 | 7/2012 |
| CN | 103167093 | 6/2013 |

(Continued)

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

(Continued)

*Primary Examiner* — Andrew L Tank
(74) *Attorney, Agent, or Firm* — Knobbe, Martens, Olson & Bear, LLP

(57) ABSTRACT

A computer-implemented method is provided to visualize data related to one or more assets utilizing an interactive geospatial map. The system may receive query criteria, indicating a geographic region of interest and/or timespan of interest, and may access a plurality of datasets including a first dataset comprising data items associated with default locations of assets and a second dataset comprising data items associated with transit events of assets, and wherein the plurality of datasets are associated with geographic locations and respective times. The system may query the plurality of datasets to determine, for assets associated with the one or more data items, expected geographic locations of the assets, and may generate user interface data configured for rendering an interactive user interface including an interactive geospatial map with indications of the expected geographic locations of the assets, and a plurality of interactive tables.

20 Claims, 8 Drawing Sheets

(51) Int. Cl.
*G06F 3/0482* (2013.01)
*G06F 16/732* (2019.01)
*H04W 4/029* (2018.01)
*G08G 1/00* (2006.01)
*G06Q 10/08* (2012.01)
*G01S 5/00* (2006.01)

(52) U.S. Cl.
CPC ........ *H04N 21/4728* (2013.01); *H04W 4/029*
(2018.02); *G01S 5/0027* (2013.01); *G06Q*
*10/0833* (2013.01)

(58) Field of Classification Search
CPC .... G06F 17/2087; G06F 16/29; G06F 3/0482;
G06F 16/7335; H04N 21/4728
See application file for complete search history.

(56) References Cited

U.S. PATENT DOCUMENTS

| | | |
|---|---|---|
| 6,820,135 B1 | 11/2004 | Dingman |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Ruknoic et al. |
| 8,744,890 B1 | 6/2014 | Bernier |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0192122 A1 | 8/2007 | Routson et al. |
| 2007/0268310 A1* | 11/2007 | Dolph .................. G06T 17/05 345/629 |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone et al. |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed et al. |
| 2009/0157732 A1 | 6/2009 | Hao et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0098318 A1 | 4/2010 | Anderson |
| 2010/0106752 A1 | 4/2010 | Eckardt et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett et al. |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |

(56) References Cited

U.S. PATENT DOCUMENTS

| | | |
|---|---|---|
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0038633 A1* | 2/2012 | Clark .................. G06T 17/05 345/419 |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |
| WO | WO 2012/061162 | 5/2012 |

OTHER PUBLICATIONS

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Capptain—Pilot Your Apps, <http://www.capptain.com> Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, <http://count.ly/> Printed Jul. 18, 2013 in 9 pages.

DISTIMO—App Analytics, <http://www.distimo.com/app-analytics> Printed Jul. 18, 2013 in 5 pages.

Psaltis, Andrew G., "Streaming Data—Designing the Real-Time Pipeline," Jan. 16, 2015, vol. MEAP VO3, pp. 0-12.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP BusinessObjects Explorer Online Help," Mar. 19, 2012, retrieved on Apr. 21, 2016 http://help.sap.com/businessobject/product_guides/boexir4/en/xi4_exp_user_en.pdf.

Sigrist, et al., "PROSITE, a Protein Domain Database for Functional Characterization and Annotation," Nucleic Acids Research, 2010, vol. 38, pp. D161-D166.

StatCounter—Free Invisible Web Tracker, Hit Counter and Web Stats, <http://statcounter.com/> Printed Jul. 19, 2013 in 17 pages.

TestFlight—Beta Testing on the Fly, <http://testflightapp.com/> Printed Jul. 18, 2013 in 3 pages.

trak.io, <http://trak.io/> printed Jul. 18, 2013 in 3 pages.

UserMetrix, <http://usermetrix.com/android-analytics> printed Jul. 18, 2013 in 3 pages.

(56) References Cited

OTHER PUBLICATIONS

Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

\* cited by examiner

| COUNTRIES | FLIGHT/TRAIN NUMBER | EMAIL | STARTING DATE | ENDING DATE |
|---|---|---|---|---|
| United States X | | | 17 May 2017 08:38 | 26 May 2017 08:38 |
| | | 460 Export Selected 466 | 470 451 | 474a 474b |
| 450 Selected Assets | Selected Lodging | Transit Events | Selected Stationed | |

| Asset Name | Asset Type | Business Segment | Business Unit | Last Location Source | Default Location | Lat | Lon |
|---|---|---|---|---|---|---|---|
| Daneil Freeman | Individual | Research | Rocketry | GPS | 5000 Michigan Avenue, Norfolk, VA | 21.29 | 12.84 |
| Tom Harbinger | Individual | Corporate & Functions | Lifeguard | Flight | 5000 Michigan Avenue, Norfolk, VA | 29.1 | 11.23 |
| Jones Halibut | Individual | Corporate & Functions | Accounting | GPS | 10 MacArthur PL, Los Angeles, CA | 23.11 | 12.11 |

FIG. 4C

| COUNTRIES | FLIGHT/TRAIN NUMBER | EMAIL | STARTING DATE | ENDING DATE |
|---|---|---|---|---|
| United States X | | | 17 May,2017 08:38 | 26 May,2017 08:38 |

| Selected Assets | Selected Lodging | Transit Events | Selected Stationed |
|---|---|---|---|

Export Selected

| Asset Name | Event Type | StartLat | StartLon | EndLat | EndLon | StartDate | StartTime | Duration |
|---|---|---|---|---|---|---|---|---|
| Daniel Freeman | GPS Location | 21.29 | 12.84 | 21.29 | 12.84 | 3/21/2017 | 13:12 UTC | 0s |
| Tom Harbinger | Flight | 29.1 | 11.23 | 12.22 | 54.32 | 3/22/2017 | 03:55 UTC | 4h 4min |
| Tom Harbinger | Flight | 12.22 | 54.32 | 15.44 | 18.22 | 3/22/2017 | 16:12 UTC | 9h 20min |
| Tom Harbinger | Hotel Booking | 15.43 | 18.18 | 15.43 | 18.19 | 3/22/2017 | 8:00 UTC | 2d 12h |
| Jones Halibut | GPS | 23.11 | 12.11 | 23.11 | 12.11 | 3/22/2017 | 08:12 UTC | 0s |
| Daniel Freeman | GPS | 21.29 | 12.84 | 21.29 | 12.84 | 3/24/2017 | 04:01 UTC | 0s |
| Daniel Freeman | Rental Car Booking | 23.15 | 12.88 | 23.15 | 12.88 | 4/12/2017 | 08:00 UTC | 5d 12h |

FIG. 4D

INTERACTIVE GEOSPATIAL MAP AND GEOSPATIAL VISUALIZATION SYSTEMS

INCORPORATION BY REFERENCE TO ANY RELATED APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to systems and techniques for accessing one or more databases and providing user interfaces for dynamic tracking of assets, according to accessed location data.

BACKGROUND

Data, such as data related to asset locations, may be electronically acquired from a variety of sources and may be stored for subsequent processing. Location information may be electronically rendered onto geospatial maps.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to systems and techniques for data collection and processing, including systems and techniques for accessing one or more databases in substantially real-time to provide information in an interactive user interface. Asset information, including location information, may be retrieved from various data sources and may be normalized and combined to track the movement of an asset. Asset information may be deduplicated to eliminate redundant information. Asset locations and other information may then be visualized using maps and tables.

Embodiments of the present disclosure relate to data processing, including database and file management, as well as a database system and database-related methods for dynamic and automated access of particular data sources and electronic data items, including event data. Embodiments of the present disclosure further relate to selective and efficient integration of electronic data items, including asset-related data. Asset-related data may be received from various sources, and may be processed using data mining and extraction techniques, such as regular expression parsing, to gather asset-related information. This information may then be standardized or normalized to allow for improved comparison and combination of data from different sources.

Assets' location information may be gathered by a database system from a variety of data sources, including location check-ins from devices equipped with satellite navigation, hotel bookings, airline tickets, IP geolocation information, car reservations, etc. Such data items may comprise various different types of information associated with, for example, a default location of an asset (e.g. data indicating an asset's permanent residence), a temporary location of an asset (e.g. a hotel booking or a reservation of a visitor office), a transit event affecting an asset (e.g. an airline booking). The system may also keep track of the locations of permanently located assets (e.g. structures).

The various data sources may be integrated in a database by using data parsing and normalization techniques. For example, data items may comprise duplicate or redundant information, which may be automatically deduplicated; data items may comprise gaps (e.g., temporal gaps), which may be resolved using interpolation methods or by querying an asset's default location. Data items may be in different formats (e.g. different timezones, geo-coordinate systems, reference frames, etc.), which may be cleaned and filtered using parsing, normalization and cross-correlation techniques.

Acquired location information may be displayed in an interactive map system and may be visualized together with the associated data items shown in interactive tables. The interactive tables may comprise functionality to sort and/or group by various attributes, and may automatically update themselves based on selection of items in the interactive map. Conversely, the interactive map may automatically update itself based on the selection of items in the interactive tables. The interactive map system may facilitate visualization of high numbers of assets and/or permanently located assets by grouping or clustering assets or permanently located asset based on type (e.g. high-ranking assets, low-ranking assets or structures) and/or transportation type (e.g. surface-based or air-based transportation).

The interactive map system may accommodate different zoom levels and/or screen resolutions by automatically declustering indications of accumulations of assets that may otherwise partially obscure each other into multiple sub-clusters or assets in a region when zoom and/or resolution is increased, while merging or combining indications of assets or clusters into superclusters when zoom and/or resolution is decreased. Interactive selection functionality may allow the user to choose assets on the map by allowing the user to draw a selection marquee and select assets that intersect the marquee. A tabular representation of the information items from the various sources may be provided simultaneously.

The interactive map system may also provide for tabular output of asset-related data; for example, tables consisting of various transit events, e.g. events causing an asset to change location, such as flights or shipments, and asset locations. Some tables may comprise deduplicated output.

BRIEF DESCRIPTION OF THE DRAWINGS

FIGS. 4A, 4B, 4C and 4D illustrate an example visualization system user interface, presenting various views and visualizations of asset-related information.

DETAILED DESCRIPTION

Figure 1:
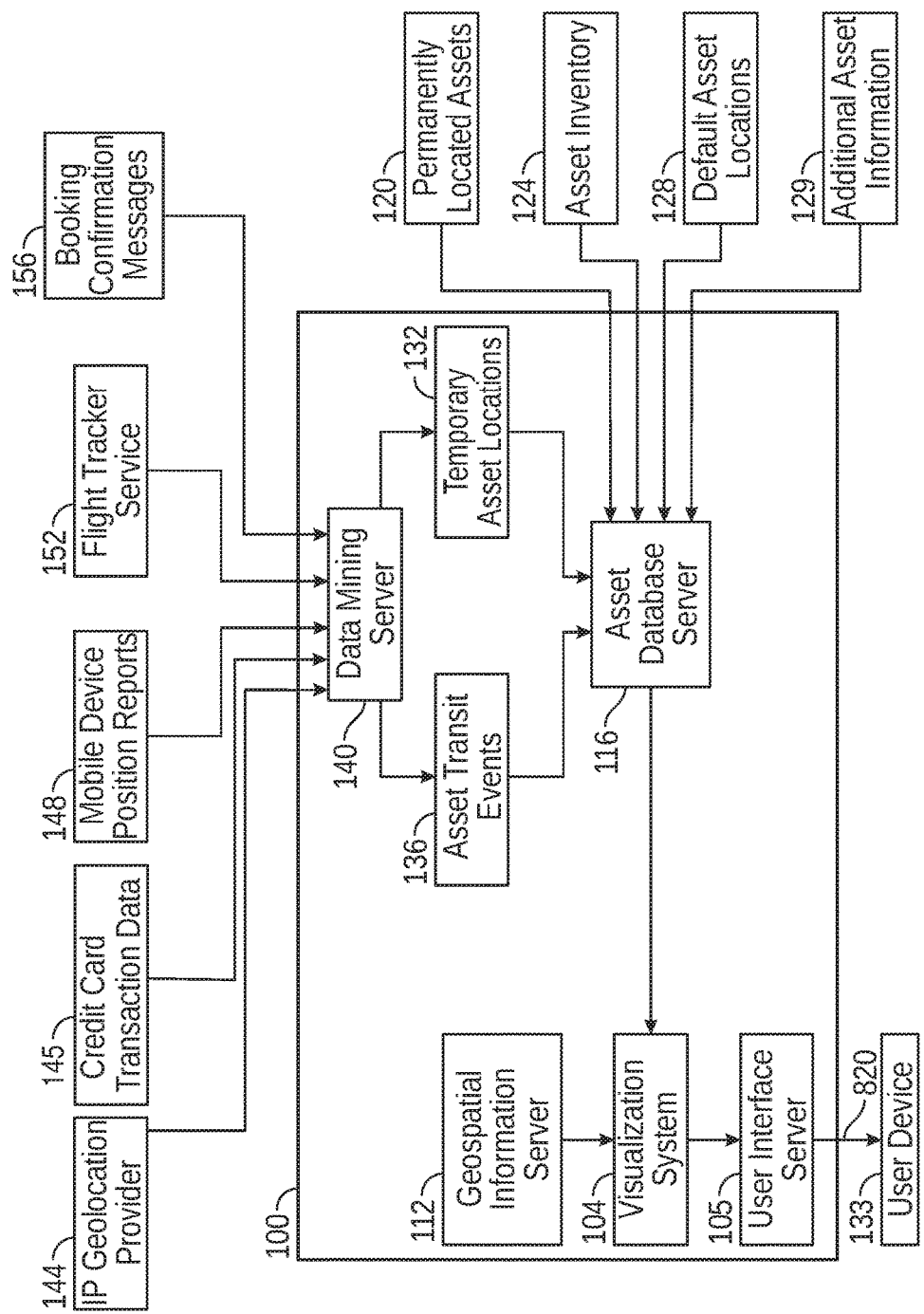
FIG. 1 is a block diagram illustrating an example visualization system in an example operating environment.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Terms

User Input (also referred to as "Input"): Any interaction, data, indication, etc., received by the system from a user, a representative of a user, an entity associated with a user, and/or any other entity. Inputs may include any interactions that are intended to be received and/or stored by the system; to cause the system to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Asset: An item, structure, vehicle, vessel, person, or any other entity that may be associated with a location. Assets may be, for example, a company office building, an individual employee (e.g. an executive), or a company aircraft. Assets may be capable of moving or being moved between locations. Events associated with such movement may be referred to herein as "transit events".

Permanently Located Asset: Some assets, by their nature, may be incapable of movement, such as a manufacturing plant. These assets may be referred to as permanently located assets.

Example Computing Devices and Systems

FIG. 1 is a block diagram illustrating an example visualization system 100, according to one embodiment of the present invention. As shown, the data analysis system 100 includes a data mining server 140, an asset database server 116, a visualization server 104, and a user interface server 105. Asset database server 116 may store and/or remotely access various databases or tables (e.g. relation databases), including a permanently located asset database 120, an asset inventory database 124, a default asset location database 128, and an additional asset information database 129. Permanently located asset database 120 and asset inventory 124 may comprise information about assets, including a type, description, and, in the case of a permanently located asset, a location associated with the asset. The default asset location database 128 may comprise default locations associated with assets, e.g. a "home base" or default office for an individual, or a home base for an aircraft.

Data mining server 140 may receive information associated with assets from various sources, such as mobile device position reports 148, credit card transaction data 145, and booking confirmation messages 156. Mobile device position reports 148 may originate from a location-aware mobile device (e.g. a cellular phone, or a satellite navigation receiver) attached to an asset (e.g. carried on an individual). Credit card transaction data 145 may comprise indications of transactions of a credit card associated with an asset (e.g. an individual). Advantageously, credit card transaction data 145 may be filtered to include only those transactions for which the associated credit card was physically present, such as by being swiped or inserted into a reader at a place of purchase ("card-present transactions"). Credit card transaction data 145 may be supplied directly from a financial institution, such as a card issuer bank, e.g. via an Application Programming Interface (API), or may be obtained by parsing or screen-scraping statements or user interfaces provided by such bank. The transactions may thus indicate the geographical location that a card was used at a given date and time, and may provide information regarding a geographical location of the asset itself at that time. Advantageously, credit card transaction information may be translated or "geo-located" into a geographical location by, for example, georesolution of an address or location associated with the credit card translation.

Booking confirmation messages 156 may comprise indications of bookings for various travel arrangements or transportation services associated with assets; for example, an individual's hotel booking, vehicle reservation or a fuel receipt for an aircraft may give an indication of that asset's location and may thus be utilized by data mining server 140 to assist in determining information associated with the asset. be received from various sources; for example, in an embodiment, data mining server 140 may receive messages from an organization's email server and apply text analysis, parsing and/or data mining techniques to parse out the relevant information. Data mining server 140 may also receive various data streams, messages or information from third parties, e.g. from an IP geolocation provider 144 or a flight tracker service 152. For example, a mobile device assigned to an individual may be configured to log into the company's VPN network whenever possible; the logon IP addresses may be retrieved from a VPN log and may be resolved to a location by IP geolocation provider 144. From the data retrieved, data mining server 140 may extract various data items, including asset transit events 136 and temporary asset locations 132, and pass those on to the asset database server 116, where they may be integrated with existing information about the assets. For example, data mining server 140 may receive information from a set of booking confirmation messages 156, indicating that a certain individual had booked a flight from an airport in California to an airport in Florida at a given time, and a return flight at a later time. Data mining server 140 may then generate asset transit events 136 to reflect the individual's two flights, and generate a temporary asset location 132 to reflect the individual's stay in Florida for the time period between the two flights.

Asset database server 116 may provide the information to visualization server 104. Visualization server 104 may combine the location information provided by asset database 116 with geospatial information from a geo spatial information server 112. In an embodiment, visualization server 104 may render the asset information received from asset database server 116 onto a geospatial map (e.g. a political map, a roadmap), a satellite image, an overlay of a map and a satellite image, or another representation of Earth's surface, received from geospatial information server 112. User interface server 105 may then render a user interface based on the visualization data received from visualization server 104 by adding interactive user interface elements 105 to the visualization data received from visualization server 104 where appropriate. In an embodiment, the map may thus become part of an interactive user interface, which may support transformations such as panning, zooming and rotating. Additionally, user interface server 104 may render tables, filtering text fields, and other user interface elements based on information received from asset database server 116.

The rendered user interface may then be transferred over a network link 820 to a user device 133, such as a laptop, desktop computer, or a smartphone. User interface server 105 may also utilize network link 820 to receive events from or interactions with user interface elements from the user device 133; for example, if the user selects a user interface element or enters text on user device 133, user interface server 105 may receive the user's actions and trigger appropriate updating of the user interface, the visualization system 104, the asset database server 116.

Figure 2:
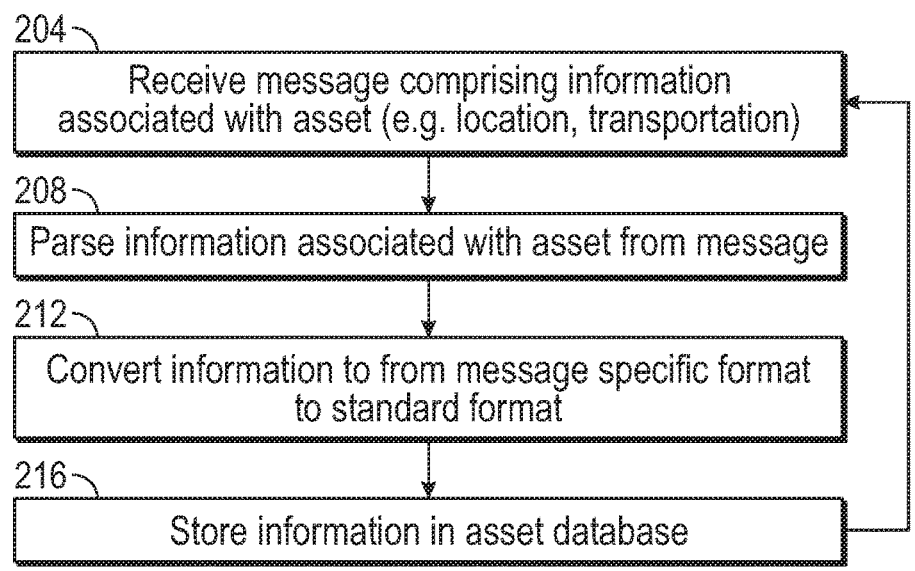
FIG. 2 is a flow chart illustrating an example method of acquiring, processing and storing information associated with an asset.

FIG. 2 is a flow chart illustrating an example method of extracting asset-related information from a message or data received by system 100, as may be performed by data mining server 140.

In block 204, a message comprising information associated with an asset, such as one of the mobile device position reports 148 or booking confirmation messages 156, is received. In block 208, the message is parsed to extract the information relevant with respect to the asset. Block 208 may be performed by modules specifically designed for the type or source of message received in block 204; for example, booking confirmation messages 156 may be processed with a routine specifically designed to parse out information from the particular sender. In an embodiment, block 204 may be performed using data mining techniques such as regular expression (regex) matching or similarity matching to extract relevant pieces of information, such as dates, locations, airport names, vessel names and individual names, from unstructured text. For example, a similarity matching algorithm, such as Levenshtein distance, may be utilized to extract pieces of information, such as asset names, that may be textually represented in different variations. A maximum threshold or distance may be used to make a determination whether two textual representations should be treated as identical. For example, if an asset is known in the database as "Riverside Municipal Airport", literal string matching would determine another asset named "Riverside Muni Airport" to be distinct. Applying Levenshtein distance matching on asset names, the algorithm would determine that the distance between the two names is 4, determine that this value is less than a threshold (e.g. 5) and may thus combine these two assets into one. Alternatively or additionally, block 204 may utilize a natural language processing system to perform this function.

In block 212, the information extracted in block 204 is converted into a standardized or common format, as appropriate for storage in asset database server 116. For example, location information may be converted from various forms, such as various coordinate formats or names of places, into a standard format (e.g. World Geographic System-based latitude-longitude pairs). Time and date information may be converted into a common format, e.g. UTC time. In block 216, the information as standardized in block 212 may be stored in one or more of the databases provided by asset database server 116 and thus associated with the remaining information about assets. Block 212 may also comprise a plausibility checking logic that discards messages comprising information that is on its face incorrect.

Figure 3:
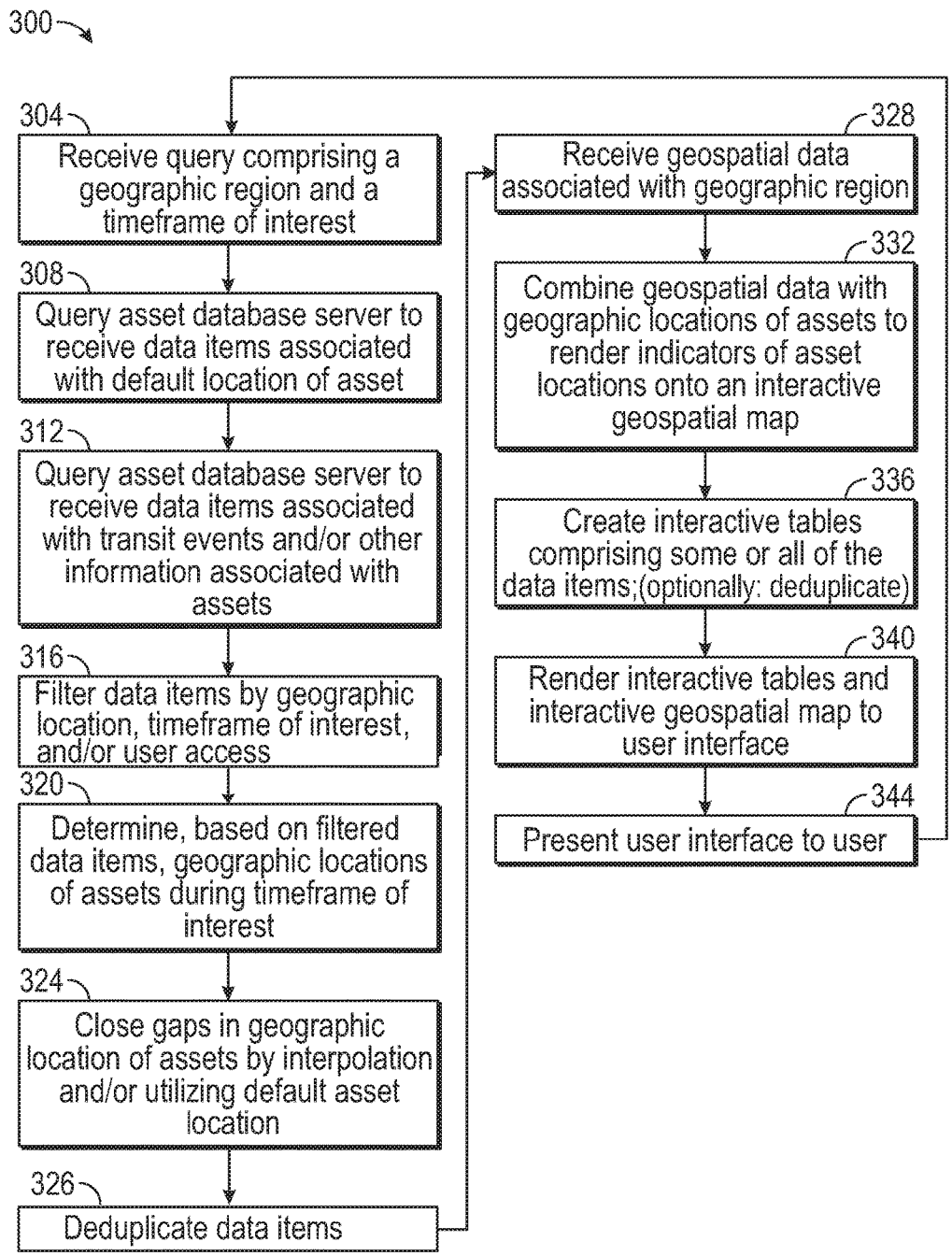
FIG. 3 is a flow chart illustrating an example method of gathering, refining and visualizing information associated with an asset.

FIG. 3 is a flow chart illustrating an example method of visualizing asset data, particularly at the location data, according to an embodiment of the present disclosure. The illustrated steps may be performed by the various components of visualization system 100.

In block 304, a request or query comprising various query criteria, such as a geographic region and a time frame of interest, is received by the system. The various query criteria may include one or more optional criteria, such as an asset type or category, or a department or function associated with the asset. The request or query may, for example, be received from a user device 820, such as a user's laptop or smartphone, through user interface server 105. For example, user interface server 105 may be a web server serving web-based user interface to the user's computing device, and receive responses and selections made by the user on the user interface.

In block 308, asset database server 116 is queried to receive data items associates with default locations of the assets, as may be stored in default asset location database 128.

In block 312, the asset database server is then queried to receive data items associated with transit events, default locations, and permanent locations associated with the assets, as may be stored in permanently located asset database 120, asset inventory database 124, and additional asset information database 129. It will be appreciated that blocks 306, 308, and 312, may be performed as a single transaction or queries to a database server, as multiple transactions or queries to one database server, or as multiple transactions or queries to different database servers. For example, steps 308, 312, and 306 may be implemented as one or more SQL transactions with asset database server 116.

In block 316, the data items, as retrieved from the database server, are filtered, to determine a set of data items associated with the geographic location and timeframe of interest, as specified in the user's query. Optionally, data items may also be filtered based on a user's access credentials; for example, users and assets may be assigned to various access groups, so that users can only see assets that they are authorized to view or have a "need to know"; alternatively, filtering may be performed on a more granular level by filtering individual data items. This may, for example, allow a user to view complete information for some assets (e.g. employees or structures associated with the user's workgroup), only view the default location or limited additional information for others (e.g. the user's remaining department) and completely hides other assets from the user's view.

In block 320, the filtered data items are processed to determine the geographic locations of the assets during the specific timeframe of interest. For example, in block 320, for each asset, a pair comprising a time span and a location may be generated, indicating the location of the asset at the specific time span. Advantageously, because the asset information in block 320 has been normalized and standardized as illustrated in FIG. 2, the processing can proceed at this step without having to take into account the different formats and data sources initially associated with the data.

In block 324, gaps in the sequence of time spans associated with one or more assets may be determined, and closed. For example, an asset may, in the absence of travel events in a given period, be presumed to be stationary during that period and thus may be considered to be at or around the location associated with the travel event closest in time to the beginning of the time period, or a default location. For example, in a situation where a travel event, such as a flight, is received for an asset, the asset may be assumed to be in the area of the destination airport until another travel event, such as a return flight, indicates a different location. The system may also, for example, determine the time period between the end of the time span associated with one data item, and the beginning of the time span associated with the next data item closest in time. This distance may be interpreted as a period of uncertainty, for which there is no data item indicative of the location of the asset during this period. This uncertainty period may be compared against a threshold and, if found to exceed the threshold, be deemed a temporal gap in the data. Such gaps in the data may then be closed by applying one or more interpolation or filling techniques. For example, a gap may be deemed associated with the asset being in its default location; as such, the asset may be deemed to have returned to its default location if a gap of sufficient duration is detected in the data. Alternatively, interpolation may be used; for example, if an asset is indicated by the data items to be at two geographically distant points at each end of the gap period, the asset may be deemed to be traveling, or moving from one location to the other location, during the gap period. Other techniques may be used instead of, or in addition to, the techniques described; additionally, an appropriate technique may be chosen based on other factors or data associated with the asset or data items. For example, the gap period may determine whether or not an asset is deemed to have returned to its default location, or is deemed to be traveling between two locations, based on the duration of the gap period.

In block 326, the filter data items are deduplicated, and checked for consistency. In this context, deduplication may be considered the process of removing data items, the information of which is entirely contained in another data item. Consistency checking may be considered the process of marking, or drawing a user's attention to, data items comprising information that disagrees with information in other data items. Advantageously, deduplication and consistency checking may be performed together. For example, deduplication may be performed by sorting the list of data items according to the beginning of their associated time span or interval, and then identifying data items whose time spans or intervals are partially or entirely overlapping or are directly adjacent. For such data items, the location may be compared. If the location agrees, the data items may be considered to comprise redundant information, and may be combined or merged, for example, into one data item whose time span is the set union of the overlapping or adjacent data items. For example, if a first data item is associated with a time interval from time A to time B, and a second data item is associated with a time interval from time B to time C, the merging process may consume both data items to yield one data item associated with a time interval from A to C. If the locations of overlapping data items do not agree, the data items may be considered to be inconsistent with each other. For such inconsistent or conflicting data items, various strategies or approaches can be adopted to either draw the user's attention to their presence, eliminate the conflicting information, or reconcile them. For example, data items may be associated with a reliability index, that describes how reliable a data item is judged as compared to other data items. For example, a data item associated with a location determined from IP address geolocation may be determined less reliable than a data item associated with a location determined through a satellite navigation system located on an asset. As such, the latter may be assigned the higher reliability index, and may thus take precedence if conflict between data items are to be resolved. Alternatively, the system may proceed with the inconsistent information, proceeding with the asset if it were located in two locations at the same time. Advantageously, this may allow the user to respond to the information as appropriate. In block 328, geospatial data associated with the geographic region of interest, is received. This geospatial data may comprise, for example, a topographic map, a political map, a satellite image, a road map, or any other representation of earth surface. The geospatial data may be received from geospatial information server 112.

In block 332, the geospatial data may be combined with the geographic location of assets, to render an interactive representation of various asset locations on a geospatial map. For example, a map or map segment corresponding to the geographic region may first be rendered, according to the geospatial data received from geospatial information server 112; visual indicators of asset locations may then be rendered onto, or superimposed, on the geospatial map. The indicators of asset locations may be representative of other information associated with the asset, such as the asset type; for example, permanently located assets, such as structures, may be associated with one type of indicator, whereas individuals, vehicles, and other types of mobile assets may be associated with one or more different types of visual indicators. The geospatial map, and the indicators of asset locations, may be interactive; specifically, by selecting an indicator of an asset location, additional information associated with the asset or asset type may be queried by a user. The map itself or a view or projection thereof may also be interactive and may support various transformations, such as zooming, panning, rotation, and tilting. Advantageously, transforming the interactive geospatial map may result in a new query being submitted to the system as discussed in the context of step 304, thus allowing the user to dynamically select or update the geographic region of interest.

In block 336, one or more interactive tables comprising some or all of the data items associated with the assets shown on the interactive geospatial map may be created. The table may, for example, comprise the data items' time spent (e.g., beginning and end time), location, source (e.g., device or data provider), and whether an inconsistency or conflict has been detected involving the data item. Advantageously, the interactive table may be sorted by one of its columns, such as the beginning of the time spent, and the user may be able to, e.g., by clicking on one of the columns, changing the column by which the table is sorted.

The data items may, optionally, be combined or deduplicated to form one or more tables indicating a combined view of the data. In this context, deduplication may refer to the process of reducing a number of data items to a lower number of data items by combining or otherwise aggregating information contained within them. The choice of data items to be combined or aggregated may be made based on a common attribute or item, such as the association with a common asset. For example, where an asset is associated with various transit events comprising multiple locations, the various transit events may be combined or aggregated to form a deduplicated table indicating only one location (e.g. a most recent location) per asset, thus providing an overview of the most current known location. Conversely, in another view or table, the transit events may be presented without deduplication, thus allowing the user to track the various travel events associated with an asset in detail. For example, a per-asset deduplicated table may indicate only one location (e.g. the most current) location for each asset, whereas a non-deduplicated table may indicate all known locations for each assets and the associated time periods. Advantageously, the user interface may permit the user to switch between the deduplicated and non-deduplicated table view, thus allowing the user to expand the level of detailed information displayed as necessary. Accordingly, in an embodiment, the table may include a de-duplicated list of assets, such that each asset (e.g., each asset associated with at least one event satisfying the search criteria) appears only one in the table. Advantageously, such a de-duplicated list of assets may provide a useful summary of all assets in likely in a given location at a given time, such that the assets may quickly be contacted (e.g., in the event of an emergency).

In block 340, the interactive table, as generated in block 336, and the interactive geospatial map, as generated in block 332, may be rendered to a user interface. For example, block 340 may be implemented by visualization server 104 and/or user interface server 105, generating a raster or vector graphics comprising the interactive map, drawing the various user interface elements comprising the interactive map and the interactive table, and generating or packaging these elements in user interface data, such as an HTML or PDF document, that may be interpreted and displayed to a user. In block 344, the user interface may be presented to a user; block 344 may be implemented, for example, by a web browser rendering the user interface data generating in 340 and displaying the rendered document to the user. Block 344 may be performed by user device 133.

Example User Interface of the Visualization System

Figure 4A:
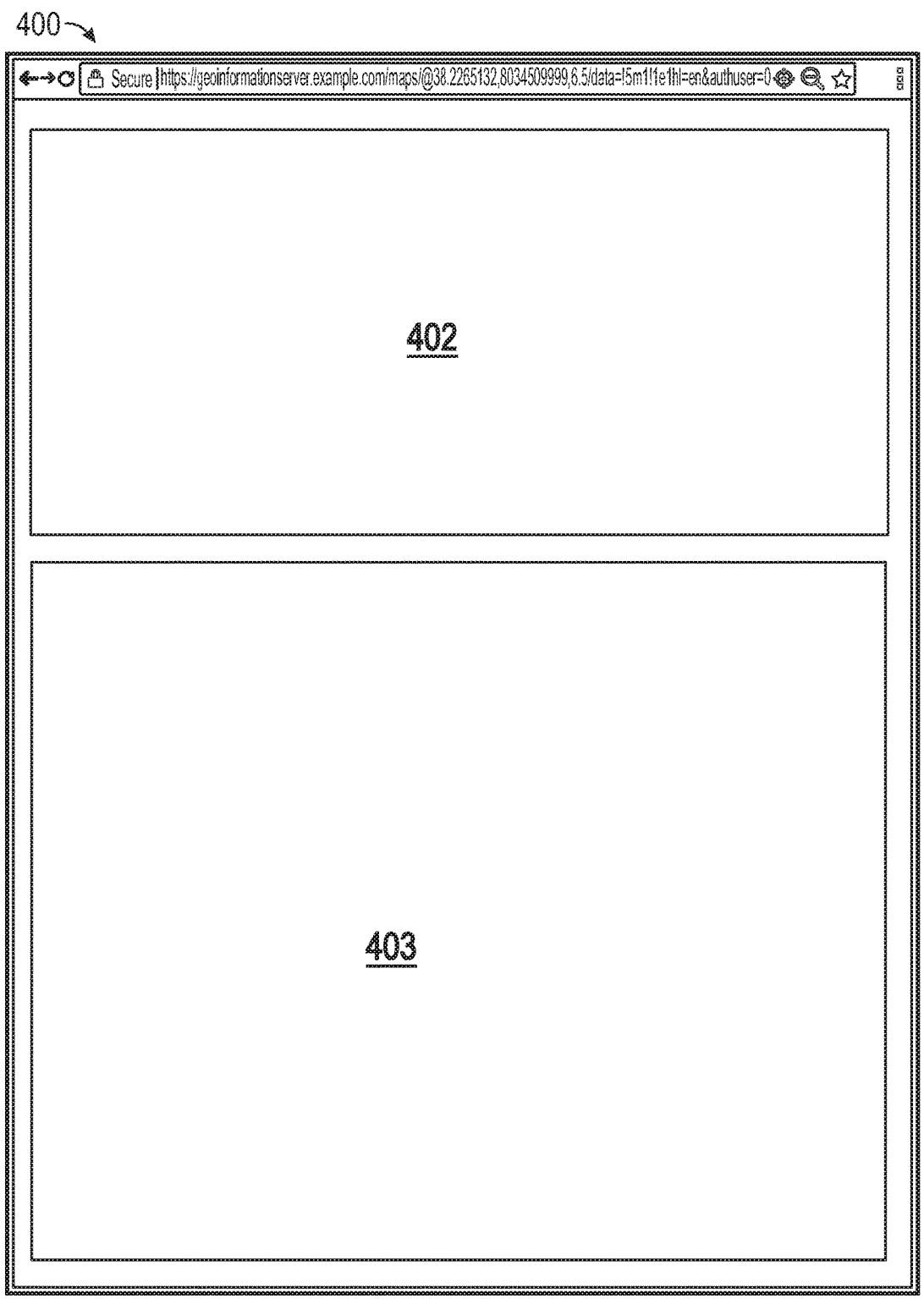
Figure 4B:
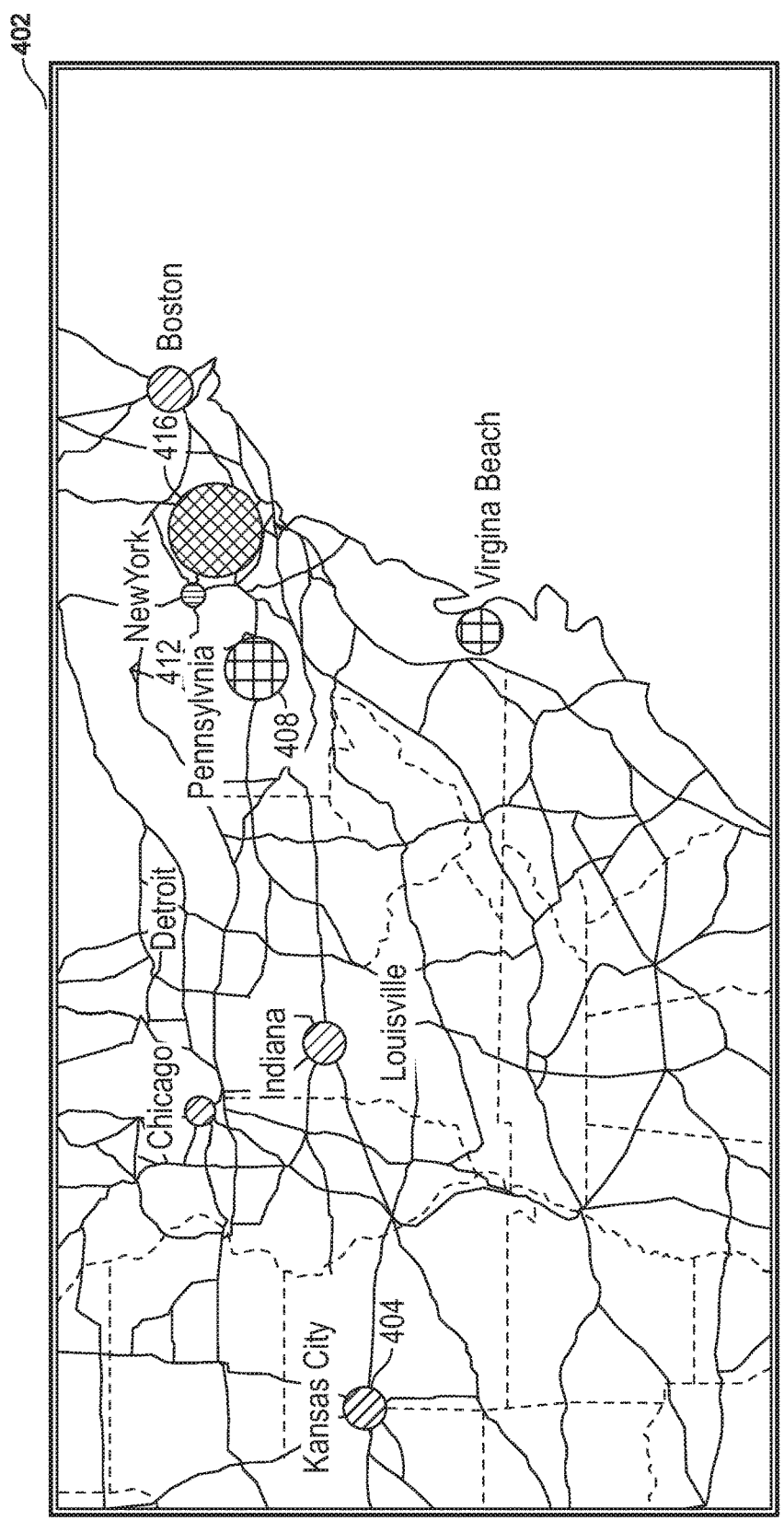

FIGS. 4A, 4B, 4C and 4D illustrate an example user interface of a visualization system according to an embodiment. FIG. 4A illustrates an example user interface 400, comprising various elements 402 (e.g., 402 in FIG. 4B) and 403 (e.g., 403A in FIG. 4C or 403B in FIG. 4D) that are broken out and further discussed with reference to FIGS. 4B, 4C and 4D. FIG. 4B illustrates the interactive map component 402 of example user interface 400, illustrating various indicators overlaid on a topographic map. The indicators may visually correspond to the type of asset; for example, an indicator of the appearance of indicator 408 may correspond to assets associated with a manufacturing department, an indicator of the appearance of indicator 412 may correspond to assets associated with a research department, and an indicator of the appearance of indicator 404 may correspond to assets associated with an operations department. Advantageously, visual indicators 408, 412, 416, and 404 may be rescaled based on whether they represent one or more assets; for example, indicator 412 may be associated with a single asset and may thus be displayed in a relatively small size. Conversely, indicator 416 may correspond to multiple assets located in spatial proximity of each other, and may thus be drawn larger to reflect that it is associated with multiple assets. Advantageously, the decision whether an asset is displayed with its own indicator or by clustering it with other assets may be made upon changing any part of the map or the underlying data. Assets may be shown by themselves to the extent this is possible without undue clutter or overlap (e.g. as long as there is a minimum of a given threshold of pixels between one indicator and the next, or the total number of indicators does not exceed a certain amount), and may otherwise be combined with other assets. For example, if the map is zoomed out, assets may be clustered, while in a more zoomed-in state, more individual assets may be revealed. Advantageously, the combination of indicators may be based on one or more criteria corresponding to visual density as perceived by a user, such as a minimum separation length or separation area in pixels, or a minimum physical length or area on a user's display device. For example, the system may have a length or area threshold, indicating a minimum size for two separate indicators for the user to comfortably perceived visually as distinct objects. For example, the system may comprise a threshold that two indicators should not be separated by less than 10 pixels, or by less than one tenth of an inch. The system may thus utilize information (e.g. the physical resolution in pixels or subpixels per inch) from the user's display device to adjust its clustering behavior to different display devices. Advantageously, this may cause the system to cluster more aggressively on low-resolution display devices, such as video projectors, while delaying clustering and thus maximizing the displayed information on high resolution display devices such as smartphone displays. If the system determines that two indicators would be shown next to each other without the minimum length or area between them, the indicators may be combined into a common larger indicator. Optionally, combination may also depend on whether the indicators are of the same type (e.g. indicators corresponding to permanently located assets may, for example, be preferentially or exclusively combined with other indicators corresponding to permanently located assets). Optionally, the clustering process may comprise a hysteresis or delay; for example, indicators may be clustered once they would have to be drawn less than 10 pixels or one tenth of an inch apart, but may be declustered once they would be drawn more than 15 pixels or one eights of an inch apart. Advantageously, this may prevent flickering and visual artifacts caused by repeated clustering-declustering induced by numerical oscillation, or the user transforming (e.g. panning or rotating) the map on a non-equal area map projection.

FIG. 4C illustrates a deduplicated table component of user interface 400, illustrating a deduplicated table 403A, comprising multiple columns, including an asset name column 450, an asset type column 454, a business segment column 456, a business unit column 460, a last location source column 466, and a default location column 470, a latitude column 474a and a longitude column 474b. Filter panes 452 allows the user to specify various parameters to only show assets matching the filter parameters. As illustrated, the user has entered "United States" into the filter pane and specified a time frame from May 17, 2017 to May 26, 2017, thus only assets located within the United States during that time period are shown. Tab pane 451 allows the user to choose a view or population of the data being presented. For example, tab pane 451 may comprise an option for "Selected Assets", as illustrated in FIG. 4C, and "Transit Events", as illustrated in FIG. 4D. The currently selected view or population may appear as a bolded or highlighted label in tab pane 451. Advantageously, some views or populations available through tab pane 451 may provide a deduplicated or otherwise aggregated view of data, whereas others views or populations may provide a non-deduplicated or raw view of data. For example, the "Selected Asset" view as illustrated in FIG. 4C may display the data on a per-asset basis and thus, reflecting the fact that each asset's location is unique, show an aggregated or deduplicated view of no more than one entry per asset. Other views or populations, such as the "transit event" view illustrated in FIG. 4D, may not comprise the deduplication or aggregation step.

The data indicated in the columns may be received from asset database server 116 and may comprise and/or be based on temporary asset locations 132, permanently located asset database 120, asset inventory database 124, default asset location database 128, and/or additional asset information database 129.

FIG. 4D illustrates a transit events table 403B component of user interface, comprising an asset name column 480, an event type column 484, a starting latitude column 492a, a starting longitude column 492b, an ending latitude column 496a, an ending longitude 496b, an start date column 498a, a start time column 498b and a duration column 498c. The data indicated in the columns may be received from asset database server 116 and may comprise temporary asset locations 136. For each transit event, asset name column indicates the asset associated with the event, event type column 484 indicates the source or type of the location information; columns 492a, 492b, 496a, and 496b indicate the starting and ending positions based on the event, and columns 498a, 498b and 498c show the start and end times of the transit event. It will be appreciated that, based on the nature of the event, some of the starting and ending positions will be the same, and the duration may be zero; for example, some transit events, such as rental car bookings or GPS location check-ins, may only offer a momentary snapshot of the asset's location.

In some embodiments, the system may provide automatic or manual updates or re-calculation of quantities, such as asset locations, and/or may provide alerts, e.g. in situations where an asset's position was not updated within a given period of time. Automatic updating may be triggered on a periodic schedule (e.g. daily, weekly, or monthly), or based on new data becoming available.

Updated information may be provided via notifications or reports that are automatically transmitted to a device operated by the user associated with a corresponding trigger. The report and/or notification can be transmitted at the time that the report and/or notification is generated or at some determined time after generation of the report and/or notification. When received by the device, the notification and/or reports can cause the device to display the notification and/or reports via the activation of an application on the device (e.g., a browser, a mobile application, etc.). For example, receipt of the notification and/or reports may automatically activate an application on the device, such as a messaging application (e.g., SMS or MMS messaging application), a standalone application (e.g., a designated report viewing application), or a browser, for example, and display information included in the report and/or notification. If the device is offline when the report and/or notification is transmitted, the application may be automatically activated when the device is online such that the report and/or notification is displayed. As another example, receipt of the report and/or notification may cause a browser to open and be redirected to a login page generated by the system so that the user can log in to the system and view the report and/or notification. Alternatively, the report and/or notification may include a URL of a webpage (or other online information) associated with the report and/or notification, such that when the device (e.g., a mobile device) receives the report, a browser (or other application) is automatically activated and the URL included in the report and/or notification is accessed via the Internet. In an embodiment, access to the report and/or notification may be controlled or restricted by an authentication scheme, for example to restrict access to authenticated users possessing a security clearance specific to the report and/or notification.

Additional Implementation Details and Embodiments

Various advantages may be provided by embodiments of the present disclosure. Asset locations may be determined from various information sources and may thus be determined with higher accuracy and fewer information gaps than using any single source. By using data mining, normalization and standardization, data sources in various formats can be utilized. By visualizing the asset location data together with other asset-related information using interactive geospatial maps and tables, the user may take advantage of this diverse array of information sources without having to manually parse these information sources. Interactive user interfaces, such as the map itself, the indicators on the map, and the interactive tables, allow the user to quickly filter the displayed information to locate the desired asset or group of assets.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
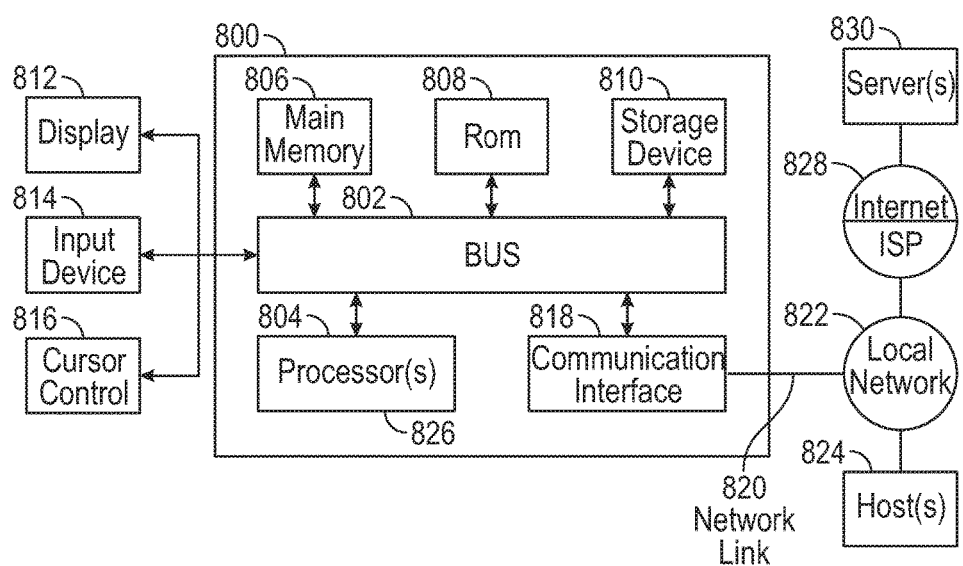
FIG. 5 illustrates an example computer system, with which certain methods discussed herein may be implemented.

For example, FIG. 5 is a block diagram that illustrates a computer system 800 upon which an embodiment may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system configured to provide visualization of data related to one or more assets via an interactive geospatial map, the system comprising:
   a computer readable storage medium having program instructions embodied therewith; and
   one or more processors configured to execute the program instructions to cause the computing system to:
      receive query criteria including at least an indication of a geographic region of interest and a timespan of interest;
      access a plurality of datasets including at least:
         a first dataset including data items associated with default locations of assets, and
         a second dataset including data items associated with transit events of assets,
         wherein the data items of the plurality of datasets are associated with respective geographic locations and respective times;
      query the plurality of datasets to identify one or more data items satisfying the query criteria;
      analyze the one or more data items to determine, for assets associated with the one or more data items, expected geographic locations of the assets;
      generate user interface data configured for rendering as an interactive user interface including an interactive geospatial map and one or more interactive tables;
      cause display, on the interactive geospatial map, of indications of the expected geographic locations of the assets; and
      receive, from an input device controlled by a user of the computing system, selection of one or more of the indications of the expected geographic locations of the assets via the interactive geospatial map;
      cause display of a first interactive table of the one or more interactive tables, the first interactive table including indications of any of the one or more data items associated with transit events of one or more assets associated with the selected one or more indications of expected geographic locations of the assets.

2. The computing system according to claim 1, wherein the region of interest is determined at least partially based a current view of the interactive geospatial map.

3. The computing system according to claim 1, wherein the plurality of datasets further comprises a third dataset, the third dataset including one or more data items associated with temporary locations of assets.

4. The computing system according to claim 3, wherein the plurality of datasets further comprises a fourth dataset, the fourth dataset including one or more data items associated with permanently located assets.

5. The computing system according to claim 1, wherein data items satisfying the query criteria include data items associated with geographic locations within the geographic region of interest and associated with times within the timespan of interest.

6. The computing system according to claim 1, wherein the one or more processors are further configured to execute the program instructions to cause the computing system to:
   determine one or more temporal gaps in the information provided by the one or more data items related to the location of the one or more assets.

7. The computing system according to claim 1, wherein the one or more processors are further configured to execute the program instructions to cause the computing system to:
   cause display, on the interactive geospatial map, of indications associated with transit events.

8. The computing system according to claim 1, wherein the one or more processors are further configured to execute the program instructions to cause the computing system to:
   identify two or more indications of the expected geographic locations of the assets located in spatial proximity of the geospatial map; and
   display, on the geospatial map, a combined indicator, comprising information associated with more than one of the two or more indicators.

9. The computing system according to claim 8, wherein a visual appearance of the combined indicator is determined at least in part based on a type of asset associated with the two or more indicators.

10. The computing system according to claim 8, wherein the two or more indications are associated with a common asset type.

11. The computing system according to claim 8, wherein spatial proximity is further determined based on a zoom level, determined based on at least a visual size or density of the two or more indicators relative to a visual size or density of a visible map area.

12. The computing system according to claim 1, wherein the one or more processors are further configured to execute the program instructions to cause the computing system to:
   cause display of a second interactive table of the plurality of interactive tables, the second interactive table being created by:
      generating one or more deduplicated data items by applying a deduplication to at least some of the data items of the plurality of datasets; and
      including indications of at least some of the one or more deduplicated data items in the second interactive table.

13. The computing system according to claim 12, wherein applying the deduplication comprises merging or removing data items associated with overlapping or adjacent time intervals.

14. The computing system according to claim 1, wherein the one or more processors are further configured to execute the program instructions to cause the computing system to:
   cause display of a third interactive table of the plurality of interactive tables, the third interactive table being created by:
      generating a list of temporary asset locations based on at least some of the data items of the plurality of datasets; and
      including indications of at least some asset locations in the list of temporary asset locations in the third interactive table.

15. The computing system according to claim 1, wherein the one or more processors are further configured to execute the program instructions to cause the computing system to:
   cause display of a fourth interactive table of the plurality of interactive tables, the third interactive table being created by:
      generating a list of locations of permanently located assets based on at least some of the data items of the plurality of datasets; and
      including indications of at least some locations in the list of locations of permanently located assets in the fourth interactive table.

16. The computing system according to claim 1, wherein at least one table in the plurality of interactive tables comprises indications of data items associated with two or more datasets in the plurality of datasets.

17. The computing system according to claim 1, wherein the one or more processors are further configured to execute the program instructions to cause the computing system to:
   determine a privilege level of a user interacting with the system;
   for one or more data items in the plurality of datasets:
      determine, based on at least the privilege level and a privilege indication associated with the one or more data items, whether the user is authorized to access the one or more data items; and
      upon a determination that the user is not authorized to access the one or more data items, exclude the one or more data items from one or more further processing steps.

18. A computer-implemented method for providing visualization of data related to one or more assets via an interactive geospatial map, the method comprising:
   receiving query criteria including at least an indication of a geographic region of interest and a timespan of interest;
   accessing a plurality of datasets including at least:
      a first dataset including data items associated with default locations of assets, and
      a second dataset including data items associated with transit events of assets,
      wherein the data items of the plurality of datasets are associated with respective geographic locations and respective times;
   querying the plurality of datasets to identify one or more data items satisfying the query criteria;
   analyzing the one or more data items to determine, for assets associated with the one or more data items, expected geographic locations of the assets;
   generating user interface data configured for rendering as an interactive user interface including an interactive geospatial map and a plurality of interactive tables;
   causing display, on the interactive geospatial map, of indications of the expected geographic locations of the assets;
   receiving, from an input device controlled by a user of the computing system, selection of one or more of the indications of the expected geographic locations of the assets via the interactive geospatial map;
   causing display of a first interactive table of the one or more interactive tables, the first interactive table including indications of any of the one or more data items associated with transit events of one or more assets associated with the selected one or more indications of expected geographic locations of the assets.

19. The method according to claim 18, wherein the region of interest is determined at least partially based a current view of the interactive geospatial map.

20. The method according to claim 18, wherein the plurality of datasets further comprises a third dataset, the third dataset including one or more data items associated with temporary locations of assets.

* * * * *